(12) United States Patent
Saruwatari et al.

(10) Patent No.: US 8,858,737 B2
(45) Date of Patent: *Oct. 14, 2014

(54) ALUMINUM-BASED SLIDING ALLOY AND CASTING APPARATUS FOR THE SAME

(75) Inventors: Kouichi Saruwatari, Inuyama (JP); Yukihiko Kagohara, Inuyama (JP); Tomoyuki Nirasawa, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 612 days.

This patent is subject to a terminal disclaimer.

(21) Appl. No.: 12/795,961

(22) Filed: Jun. 8, 2010

(65) Prior Publication Data
US 2010/0310896 A1    Dec. 9, 2010

(30) Foreign Application Priority Data
Jun. 8, 2009    (JP) .................................. 2009-137176

(51) Int. Cl.
| | | |
|---|---|---|
| C22C 21/02 | (2006.01) | |
| C22C 21/04 | (2006.01) | |
| F16C 33/12 | (2006.01) | |
| B22D 11/06 | (2006.01) | |
| B22D 11/22 | (2006.01) | |
| F16C 33/14 | (2006.01) | |

(52) U.S. Cl.
CPC ................. *F16C 33/12* (2013.01); *C22C 21/04* (2013.01); *C22C 21/02* (2013.01); *B22D 11/0622* (2013.01); *B22D 11/0682* (2013.01); *B22D 11/22* (2013.01); *F16C 33/14* (2013.01)
USPC ............................ 148/437; 148/688; 420/548

(58) Field of Classification Search
CPC ............................... C22C 21/02; C22C 21/04
USPC .................................... 148/437, 688; 420/548
See application file for complete search history.

(56) References Cited

U.S. PATENT DOCUMENTS

| 5,028,393 A | 7/1991 | Tanaka et al. |
| 5,053,286 A | 10/1991 | Pratt et al. |
| 5,536,587 A | 7/1996 | Whitney |
| 6,833,339 B2 | 12/2004 | Whitney, Jr. et al. |

FOREIGN PATENT DOCUMENTS

| DE | 4015593 A1 | 12/1990 |
| EP | 0861912 A2 | 9/1998 |
| JP | 58136737 A | 8/1983 |
| JP | 03006345 | 1/1991 |
| JP | 11172465 | 6/1999 |
| WO | 9601180 A | 4/1996 |
| WO | 0240883 A1 | 5/2002 |

OTHER PUBLICATIONS

Opposition brief by Federal-Mogul Wiesbaden GmbH against German patent application DE 10 2010 029 158.7, dated Mar. 22, 2012.
Opposition brief by KS Gleitlager GmbH against German patent application DE 10 2010 029 158.7, dated Mar. 5, 2012.
G.W.P. AG, "Aluminiumlegierungen fur Kokilenguss und Niederdruckguss entsprechend der japanischen, chinesischen, amerikanischen und deutschen/europaischen Industrienorm," Mar. 12, 2012.
Haga, T. et al., "High speed twin roll caster for aluminum alloy thin strip", OCSCO World Press, Journal of Achievements in Materials and Manufacturing Engineering, vol. 24, Issue 1, pp. 365-371, Sep. 2007.
Suzuki, Kenta et al., "Refined Solidification Structure and Improved Formability of A356 Aluminum Alloy Plate Produce using High-Speed Twin-Roll Strip Caster", The Japan Institute of Metals, Materials Transactions, vol. 45, No. 2, pp. 403-406, 2004.

*Primary Examiner* — Brian Walck
(74) *Attorney, Agent, or Firm* — Browdy and Neimark, PLLC

(57) ABSTRACT

An aluminum-based sliding alloy containing 1 to 15 mass % of Si is provided. Si precipitates in the form of particles in an observation field of the aluminum-based sliding alloy. The Si particles have a maximum diameter of 0.01 to 7.5 μm and the total area of Si particles having a diameter of not more than 5.5 μm accounts for not less than 95% of the total area of the Si particles present in the aluminum-based sliding alloy.

4 Claims, 2 Drawing Sheets

ALUMINUM-BASED SLIDING ALLOY AND CASTING APPARATUS FOR THE SAME

TECHNICAL FIELD

The present invention relates to an aluminum-based sliding alloy containing Si (silicon) and a casting apparatus for the same.

BACKGROUND OF THE INVENTION

Slide bearings lined with an aluminum-based sliding alloy have relatively good initial conformability and excellent fatigue resistance under high specific load. Therefore, they are used as bearings for high output engines of automobiles and general industrial machinery.

An aluminum-based sliding alloy having a better fatigue resistance is disclosed, for example, in JP-A-3-6345. JP-A-3-6345 discloses that the aluminum-based sliding alloy contains 1 to 15 mass % of Si and also Sr (strontium) so as to have finely crystallized Si. JP-A-3-6345 also discloses that the finely crystallized Si particles make it possible that the aluminum-based sliding alloy withstands high load and can be prevented from becoming brittle, providing a good fatigue resistance.

JP-A-11-172465 also discloses an aluminum-based sliding alloy containing Si. JP-A-11-172465 discloses that wear resistance is improved by adding 26 to 80 mass % of Si to an Al (aluminum) matrix, allowing the Si particles to have an average particle size ranging from 0.01 μm or more and less than 10 μm, and further, allowing not less than 3 mass % of Si to solid-solute in the Al matrix.

SUMMARY OF THE INVENTION

In recent internal combustion engines, housings of connecting rods or the like, to which a slide bearing is installed, have been made lightweight to improve fuel efficiency. However, when the housing is made thinner for weight saving, a rigidity of the housing decrease and deformation of the housing easily occurs. As a result, dynamic load on a shaft supported by an aluminum-based sliding alloy (slide bearing) or the like causes deformation of housings, and consequently the aluminum-based sliding alloy is more likely to be bent and deformed, increasing the occurrence of fatigue in the aluminum-based sliding alloy.

There is also a demand for using lubricating oil having low viscosity to improve fuel efficiency. However, when such low viscosity lubricating oil is used, lubricating oil film is more likely to be broken under the dynamic load on the shaft supported by the aluminum-based sliding alloy or the like. As a result, the shaft and the aluminum-based sliding alloy come in direct contact more frequently and increase in the temperature caused by the frictional heat causes a decrease in the strength, increasing the occurrence of fatigue.

In such environment, the fatigue resistance obtained in JP-A-3-6345 is insufficient. Moreover, since Sr is added to an aluminum-based sliding alloy to crystallize fine Si in the structure in JP-A-3-6345, Sr intermetallic compounds may segregate. When such segregation occurs, cracks may be caused there under severe conditions. For this reason, it is desired that fine Si are crystallized without using Sr.

In JP-A-11-172465, since not less than 26% of Si is added to an Al matrix, the alloy may become brittle as described in JP-A-3-6345, and is inadequate for use in recent severe sliding applications.

The present invention has been made in view of the above circumstances and an object thereof is to provide an aluminum-based sliding alloy which is less likely to become brittle and has excellent fatigue resistance, and a casting apparatus for the same.

The present inventors have conducted intensive studies with focus on the size of Si particles in an aluminum-based sliding alloy which has improved fatigue resistance by adding 1 to 15 mass % of Si. As a result, the inventors have found that the fatigue resistance of the aluminum-based sliding alloys are different depending on the size of Si particles in the aluminum-based sliding alloys containing 1 to 15 mass % of Si even if the content of Si is same. In other words, aluminum-based sliding alloys containing 1 to 15 mass % of Si come to have a better fatigue resistance when Si particles have a size in a predetermined range even if the content of Si is same.

According to an aspect of the present invention, an aluminum-based sliding alloy contains 1 to 15% mass of Si. Si precipitates in a form of particles in an observation field of the aluminum-based sliding alloy. The Si particles have a maximum diameter of 0.01 to 7.5 μm and the total area of the Si particles having a diameter of not larger than 5.5 μm accounts for not less than 95% of the total area of the Si particles in the aluminum-based sliding alloy.

According to another aspect of the invention, a casting apparatus for an aluminum-based sliding alloy is provided. The apparatus comprises: a pair of rolls; a molten metal supply nozzle for supplying molten metal of Al or an Al alloy added with Si between the pair of rolls; and a cooling device for cooling the pair of rolls, wherein the pair of rolls cools the molten metal supplied from the molten metal supply nozzle at a rate of 80 to 130° C./sec, thereby casting the aluminum-based sliding alloy described above.

DETAILED DESCRIPTION OF THE INVENTION

Hereinafter, the aluminum-based sliding alloy of the present invention will be described for application of an aluminum-based sliding alloy layer of a slide bearing, which is produced by lining the aluminum-based sliding alloy of the present invention on a back metal layer. The aluminum-based sliding alloy may be used as a sliding member without lining on the back metal layer.

Figure 1:
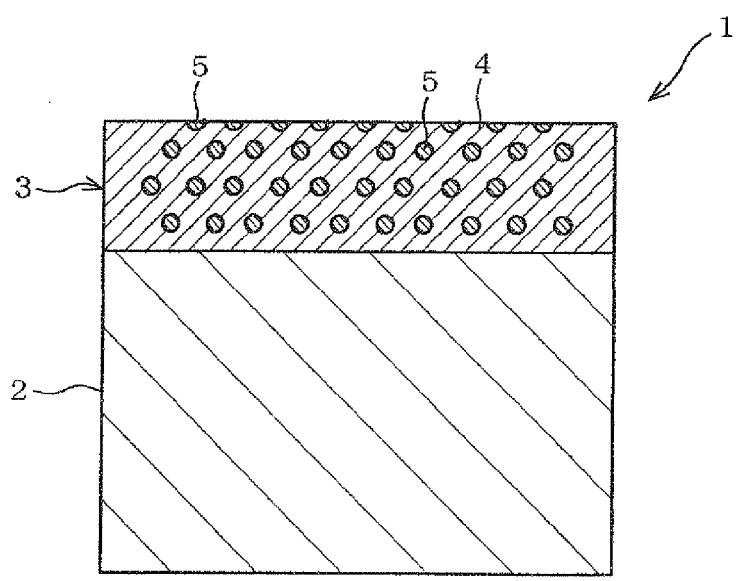
FIG. 1 is a cross-sectional view of the aluminum-based sliding alloy of the present invention.

First, an example of a basic form of an aluminum-based sliding alloy is shown in FIG. 1. A slide bearing 1 shown in FIG. 1 is composed of a base material 2 and an aluminum-based sliding alloy layer (aluminum-based sliding alloy) 3 lined on the base material 2.

The aluminum-based sliding alloy layer 3 comprises a matrix 4 of Al or an Al alloy added with 1 to 15 mass % of Si. Si is present in a form of particles (Si particles 5) in an observation field. The higher is the ratio of Si particles 5 in the aluminum-based sliding alloy layer 3, the harder is the aluminum-based sliding alloy layer 3 and the higher is the fatigue resistance of the slide bearing. When Al or the Al alloy contains not less than 1 mass % of Si, the hardness of the Si particles 5 has an effect of improving the fatigue resistance of the slide bearing 1. Also, when Al or the Al alloy contains not more than 15 mass % of Si, the aluminum-based sliding alloy layer 3 can be prevented from becoming brittle.

In the present invention, Si particles 5 in the aluminum-based sliding alloy layer 3 have a maximum diameter of 0.01 to 7.5 μm. The maximum diameter of Si particles 5 is determined as follows. The aluminum-based sliding alloy layer 3 is observed by an electron microscope from e.g. the sliding surface side, and the area of the Si particles 5 is measured. The areas thereof are converted to a circle having the same area, and the diameter of the circle is calculated. The largest one among the diameters of the Si particles 5 is determined to be the maximum diameter of Si particles 5. In the present invention, the maximum diameter of the Si particles 5 in the aluminum-based sliding alloy layer 3 is smaller than 10 μm which is average particle sizes of Si particles of in conventional structures described, for example, in JP-A-11-172465.

In the present invention, the total area of Si particles 5 having a diameter of not more than 5.5 μm accounts for not less than 95% of the total area of the Si particles 5 present in the aluminum-based sliding alloy layer 3. In other words, almost all of the Si particles 5 in the aluminum-based sliding alloy layer 3 have a diameter of not more than 5.5 μm. As herein described, by controlling the diameter of Si particles so that the total area of Si particles 5 having a diameter of not more than 5.5 μm accounts for not less than 95% of the total area of the Si particles 5 present in the aluminum-based sliding alloy layer 3 in the present invention, Si particles 5 having an average diameter smaller than Si particles in the conventional alloys are densely precipitated in the aluminum-based sliding alloy layer 3. This makes the aluminum-based sliding alloy layer 3 harder, improving the fatigue resistance.

According to another embodiment of the present invention, an average regional area of all Si particles in the aluminum-based sliding alloy is in a range from 5 to 10 μm² as measured by a region splitting method.

Figure 2:
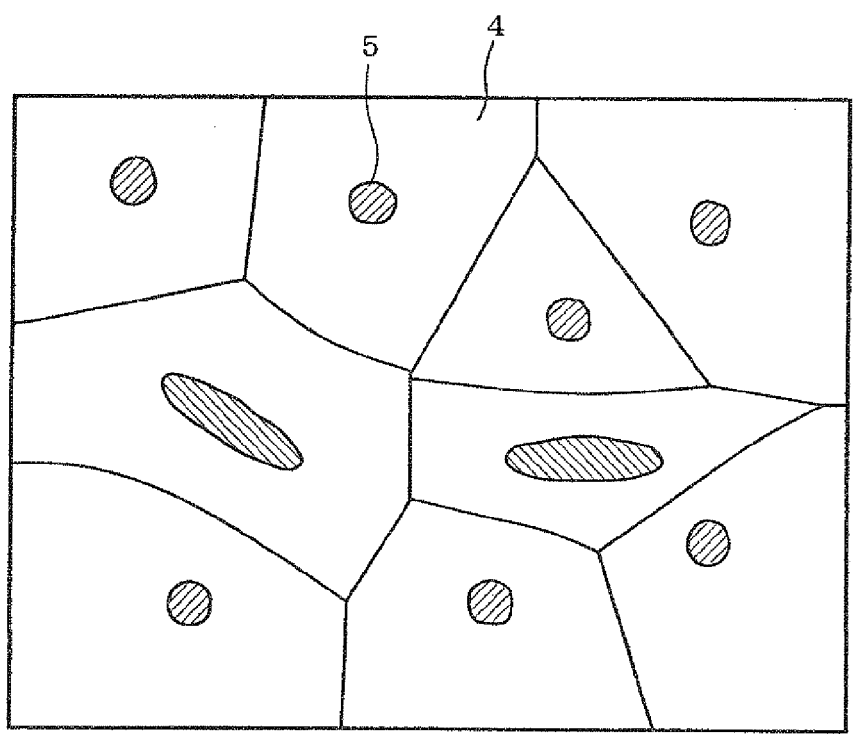
FIG. 2 is a schematic view illustrating a region splitting method.

The region splitting method involves, as shown in FIG. 2, drawing a line between adjacent Si particles 5 in a matrix 4 (in the present invention, a line that separates Voronoi polygons which is converted from the Si particles 5 in an observation area) to define regions which each single Si particle 5 occupies (regions surrounded by the drawn lines, referred to as region segmenting cells), calculating statistically the regional areas, and quantitatively determining the region segmented areas.

Thus, when the Si content is same, the size of Si particles 5 and the number of Si particles 5 are correlated. As the Si particles 5 are larger, the number of particles becomes smaller and the region segmented area (an average regional area occupied by each particle) is larger. On the other hand, as the Si particles 5 become smaller, the number of particles becomes larger and the region segmented area becomes smaller. Therefore, the size of region segmented areas can quantitatively show the size of the Si particles 5.

According to the present invention, the average regional area of all the Si particles 5 is preferably 5 to 10 μm² as measured by a region splitting method. When the average regional area is not more than 10 μm² as measured by the region splitting method, small Si particles 5 are more densely and homogeneously precipitated in the aluminum-based sliding alloy layer 3. In such a case, the aluminum-based sliding alloy layer 3 becomes harder and the fatigue resistance is further improved. When the average regional area is not less than 5 μm² as measured by the region splitting method, there is an advantage in the production.

The slide bearing 1 is produced through steps of casting, rolling, roll bonding, heating (annealing) and mechanical-processing. More specifically, molten metal of Al or an Al alloy containing Si is cast into a plate in the casting step. The aluminum-based sliding alloy 3 which has been cast into a plate is rolled in the rolling step and pressure-welded to a steel plate (back metal layer (base material 2)) in the pressure-welding step, thereby forming a plate for forming bearings. An intermediate layer composed of pure Al and the like may be formed between the aluminum-based sliding alloy 3 and the steel plate. Subsequently, the plate for forming bearings is annealed and subjected to mechanical processing to form a semi-cylindrical or cylindrical bearing. The plate for forming bearings may be rolled depending on the purpose of use. Here, the present inventors have found that Si particles 5 having a maximum diameter of 0.01 to 7.5 μm can exist in the aluminum-based sliding alloy 3 by controlling the cooling rate in the casting step without adding Sr for crystallizing fine Si particles as disclosed in JP-A-3-6345.

According to another aspect of the present invention, a casting apparatus for an aluminum-based sliding alloy is provided. The apparatus has a pair of rolls, a molten metal supply nozzle for supplying molten metal of Al or the Al alloy added with Si between the pair of rolls, and a cooling device for cooling the pair of rolls. The molten metal supplied from the molten metal supply nozzle is cooled by the pair of rolls at a rate of 80 to 130° C./sec, thereby producing the aluminum-based sliding alloy according to the invention described above, by casting.

Figure 3:
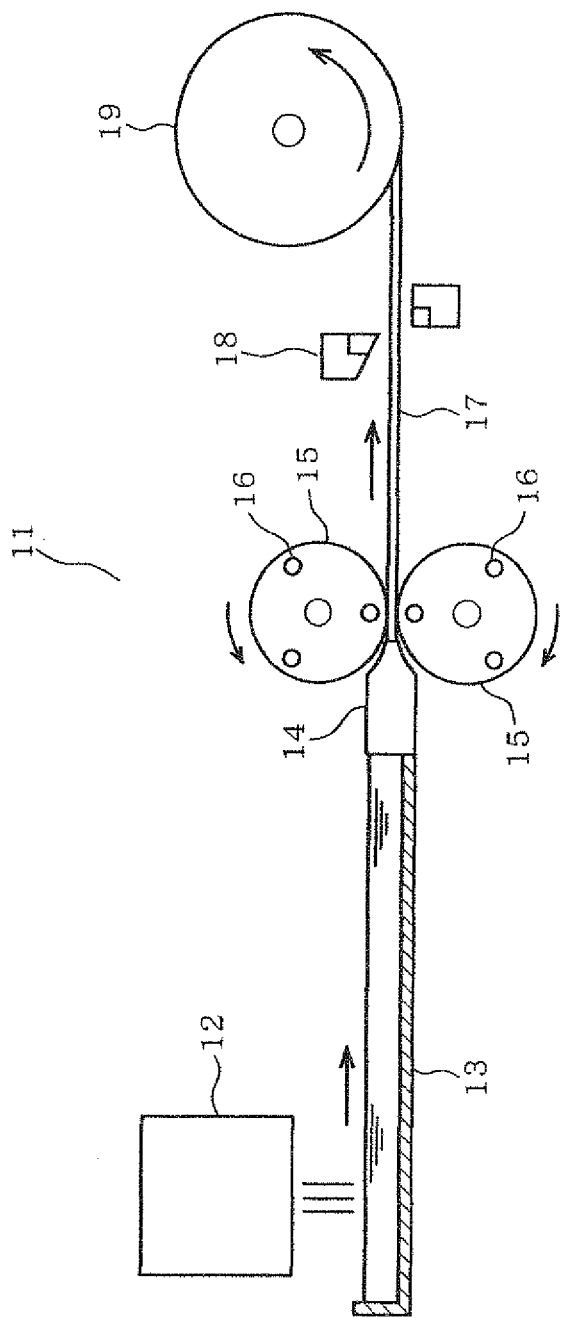
FIG. 3 is a side view illustrating a general structure of a casting apparatus.

By cooling the molten metal of Al or an Al alloy added with Si with use of the casting apparatus 11 of the present invention, such as shown in FIG. 3, at a cooling rate of 80 to 130° C./sec, the molten Si crystallizes in an Al matrix 4. The crystallized Si (Si particle 5) has a smaller average diameter than conventional crystallized Si (Si particles). By supplying the molten metal of Al or an Al alloy added with 1 to 15 mass % of Si between the pair of rolls cooled by a cooling device, and by cooling the molten metal at a rate of 80 to 130° C./sec, the maximum diameter of the Si particle 5 in the aluminum-based sliding alloy layer 3 can be adjusted to 0.01 to 7.5 μmm. This makes it possible that the total area of Si particles 5 having a diameter of not more than 5.5 μm account for not less than 95% of the total area of the Si particles 5 present in the aluminum-based sliding alloy layer 3. This also makes it possible that an average regional area of all Si particles 5 in the aluminum-based sliding alloy layer 3 is 5 to 10 μm² as measured by a region splitting method.

EXAMPLES

To examine the advantage of the present invention, samples of a slide bearing 1 (Examples 1 to 12, Comparative Examples 21 to 23) having an aluminum-based sliding alloy 3 with contents shown in Table 1 were produced and subjected to a fatigue resistance test.

TABLE 1

| | Sample No. | Compositions of aluminum-based sliding alloys | | Diameter of Si particle | | Si region segmenting cell | | Maximum specific load without fatigue (MPa) |
|---|---|---|---|---|---|---|---|---|
| | | Al (mass %) | Si (mass %) | Maximum diameter of Si particle (μm) | having area ratio of 95% (μm) | Average area (μm²) | Uniformity of Si particle distribution | |
| Examples | 1 | balance | 1.0 | 2.7 | 1.8 | 27.9 | Medium | 130 |
| | 2 | balance | 1.0 | 2.2 | 1.5 | 23.3 | Medium | 130 |
| | 3 | balance | 1.0 | 1.9 | 1.3 | 20.0 | Medium | 130 |

TABLE 1-continued

|  | Sample No. | Compositions of aluminum-based sliding alloys | | Maximum diameter of Si particle (μm) | Diameter of Si particle having area ratio of 95% (μm) | Si region segmenting cell | | Maximum specific load without fatigue (MPa) |
|---|---|---|---|---|---|---|---|---|
|  |  | Al (mass %) | Si (mass %) |  |  | Average area (μm²) | Uniformity of Si particle distribution |  |
|  | 4 | balance | 6.0 | 7.2 | 4.9 | 20.6 | Medium | 130 |
|  | 5 | balance | 6.0 | 6.6 | 4.5 | 17.3 | Medium | 130 |
|  | 6 | balance | 6.0 | 5.7 | 3.9 | 11.8 | Medium | 140 |
|  | 7 | balance | 15 | 7.4 | 5.0 | 15.4 | Medium | 130 |
|  | 8 | balance | 15 | 6.2 | 4.2 | 12.8 | Medium | 140 |
|  | 9 | balance | 15 | 5.3 | 3.6 | 11.0 | Medium | 140 |
|  | 10 | balance | 6.0 | 5.0 | 3.4 | 8.9 | High | 150 |
|  | 11 | balance | 6.0 | 4.4 | 3.0 | 7.7 | High | 150 |
|  | 12 | balance | 6.0 | 4.0 | 2.7 | 5.0 | High | 150 |
| Comparative | 21 | balance | 1.0 | 6.8 | 6.0 | 40.8 | Low | 120 |
| Examples | 22 | balance | 15 | 17.4 | 13.3 | 23.8 | Medium | 120 |
|  | 23 | balance | 2.5 | 10.4 | 27.3 | 90 | Low | 110 |

Examples 1 to 12 were produced as follows. After Al and Si were melted at a ratio shown in Table 1, and cast in the casting apparatus 11 shown in FIG. 3.

The casting apparatus 11 has a melting furnace 12 for storing materials to be cast. In the present invention, materials to be melt having contents shown in Table 1 were introduced into the melting furnace 12. The compositions shown in Table 1 may inevitably contain impurities.

The casting apparatus 11 has a bath 13 for storing molten metal flown from the melting furnace 12.

A molten metal supply nozzle 14 for discharging the molten metal stored in the bath 13 is attached to a part of the bath 13. A pair of rolls 15, is positioned at the front edge of the molten metal supply nozzle 14 with a small gap between each other. The pair of rolls 15, 15 is positioned so that their axes are perpendicular to the flow of the molten metal and extends in the horizontal direction. Thereby, the molten metal in the melting furnace 12 passes through the bath 13 and the molten metal supply nozzle 14 and is supplied between the pair of rolls 15, 15.

The pair of rolls 15, 15 is cooled by cooling tubes 16 which are a cooling device. The cooling tubes 16 are disposed inside the pair of rolls 15, 15, extending in the direction of the axis. The pair of rolls 15, 15 is cooled by a refrigerant, such as water, supplied in the cooling tubes 16. The amount and rate of water supplied into the cooling tubes 16 are adjusted by the degree of opening and closing of a valve (not shown) controlled by a controlling apparatus (not shown). In the present invention, the degree of opening and closing of the valve is adjusted so that the molten metal supplied between the pair of rolls 15, 15 from the molten metal supply nozzle 14 is cooled at a rate of 80 to 130° C./sec. The molten metal is cooled at a rate of 80 to 130° C./sec until the molten metal reaches 550° C.

The molten metal is cooled by the pair of rolls 15, 15 and solidified into a cast plate 17 (sheet-like aluminum-based sliding alloy 3). The resulting cast plate 17 is cut by a cutter 18 in a pre-determined length and coiled on a coiler 19. The sheet-like aluminum-based sliding alloy 3 cut into a pre-determined length is roll bonded to a steel plate constituting a back metal layer (base material 2). A plate for forming bearings (so-called bimetal) is produced in this way. The plate for forming bearings is annealed by heating for a few hours and subjected to mechanical processing to produce slide bearings. In this way, Examples 1 to 12 were produced. While Examples 1 to 9 were cooled at 80 to 100° C./sec and Examples 10 to 12 were cooled at 100 to 130° C./sec, none of those aluminum-based sliding alloys had solid-soluted Si at not less than 3 mass %.

On the other hand, the process for producing Comparative Examples 21 to 23 was different from that for producing Examples 1 to 12 described above. In place of the cooling rate in the casting step of 80 to 130° C./sec, a conventional cooling rate of 3 to 6° C./sec was employed for cooling in these cases as described in JP-A-2002-120047. The other steps are carried out in the same manner as Examples 1-12.

The Examples 1 to 12 and Comparative Examples 21 to 23 produced as described above were subjected to a fatigue resistance test under the test conditions shown in Table 2. The results are shown in Table 1.

TABLE 2

| Number of revolutions | 3250 r.p.m. |
|---|---|
| Test duration | 20 hours |
| Oil supply temperature | 100° C. |
| Oil supply pressure | 0.5 MPa |
| Lubricating oil | VG68 |
| Evaluating method | Maximum surface pressure without fatigue |

The "diameter of an Si particle having an area ratio of 95%" in Table 1 is an example for proving that the total area of Si particles having a diameter of not more than 5.5 μm accounts for not less than 95% of the total area of the Si particles. The "diameter of an Si particle having an area ratio of 95%" is obtained as follows. Accumulating the areas of Si particles 5 in an observation field from the smallest area and determining the diameter of an Si particle 5 with which the total area accounts for 95% of the total area of all the Si particles 5. The diameter of the Si particle 5 can be obtained by observing the aluminum-based sliding alloy layer 3 by an electron microscope from the sliding surface side, measuring the area (projected area) of the Si particle 5 and converting the resulting area to a circle as described above.

Specifically, the "diameter of a Si particle having an area ratio of 95%" is determined as follows. If many Si particles are present on the sliding surface of an aluminum-based sliding alloy and the total area of the Si particles (total area of projected areas) is 1000 μm² the area of 95% to the total area of the Si particles corresponds to 950 μm². The areas (projected areas) of Si particles are accumulated from the smallest area and an Si particle with which the area reaches 950 μm² is detected. The diameter of the detected Si particle is calculated by converting the area of the Si particle to a circle. The "diameter of an Si particle having an area ratio of 95%" is determined in this way.

As the "diameter of an Si particle having an area ratio of 95%" is smaller, Si particles 5 having a small diameter are present more densely in the aluminum-based sliding alloy layer 3.

The "Si region segmenting cell" in Table 1 means one region on the sliding surface of the aluminum-based sliding alloy layer 3 segmented by a region splitting method. The "average area" in Table 1 represents an average area of the "Si region segmenting cells". As the "average area" is smaller, small Si particles are precipitated more densely and homogeneously.

For the "uniformity of Si particle distribution" in Table 1, those having an "average area" of not more than 10 $\mu m^2$ are represented by "high", those having an "average area" of more than 10 $\mu m^2$ and not more than 30 $\mu m^2$ by "medium" and those having an "average area" of more than 30 $\mu m^2$ by "low".

Next, the results of the above test are discussed.

The results of the fatigue resistance test prove that Examples 1 to 12 have excellent fatigue resistance compared to Comparative Examples 21 to 23 because the Si particles 5 have a smaller maximum diameter and the Si particle having an area ratio of 95% has a smaller diameter.

Comparing Examples 1 to 9 and Examples 10 to 12, it is shown that the fatigue resistance can be improved by making the average area of Si region segmenting cells smaller.

Although not shown in Table 1, a fatigue resistance as high as that of Examples 1 to 12 was achieved even when using an aluminum alloy, instead of aluminum, to which at least one element of 1 to 10 mass % of Zn, 0.1 to 5 mass % of Cu and 0.05 to 5 mass % of Mg is added in Examples 1 to 12.

The present invention can be modified appropriately without departing from the spirit of the invention.

The invention claimed is:
1. An aluminum-based sliding alloy containing 1 to 15 mass % of Si,
   wherein Si precipitates in a form of particles in an observation field of the alloy, the Si particles having a maximum diameter of 0.01 to 7.5 $\mu m$ and a total area of the Si particles having a diameter of not larger than 5.5 $\mu m$ accounting for not less than 95% of a total area of the Si particles in the observation field,
   wherein the alloy has an average regional area of all areas of the Si particles when measured by a region splitting method, the average regional area being not greater than 10 $\mu m^2$.
2. The aluminum-based sliding alloy according to claim 1, wherein the alloy has an average regional area of all areas of the Si particles when measured by a region splitting method, the average regional area being 5 to 10 $\mu m^2$.
3. An aluminum-based sliding alloy comprising 1 to 15 mass % Si,
   the Si being precipitated as particles in an observation field of the alloy wherein the Si particles have a maximum diameter of 0.01 to 7.5 $\mu m$, and
   wherein the Si particles having a diameter of not larger than 5.5 $\mu m$ account for not less than 95% of the total area of the Si particles in the observation field, and
   wherein the alloy has an average regional area of all areas of the Si particles when measured by a region splitting method with the average regional area being not greater than 10 $\mu m^2$.
4. The aluminum-based sliding alloy of claim 3 wherein the aluminum-based sliding alloy is a product of cooling a melt of Al or an Al alloy containing said 1-15 mass % of Si at a rate of 80 to 130° C. per second to a temperature of 550° C., and solidified.

* * * * *